United States Patent [19]
Kessler

[11] Patent Number: 5,877,604
[45] Date of Patent: Mar. 2, 1999

[54] CIRCUIT FOR OPERATING AN ELECTRIC MOTOR

[75] Inventor: Martin Kessler, Buehl, Germany

[73] Assignee: Robert Bosch GmbH, Stuttgart, Germany

[21] Appl. No.: 809,054

[22] PCT Filed: Aug. 17, 1995

[86] PCT No.: PCT/DE95/01084

§ 371 Date: Mar. 10, 1997

§ 102(e) Date: Mar. 10, 1997

[87] PCT Pub. No.: WO96/08065

PCT Pub. Date: Mar. 14, 1996

[30] Foreign Application Priority Data

Sep. 9, 1994 [DE] Germany .................. 44 32 059.0

[51] Int. Cl.⁶ .................................................. G05B 5/00
[52] U.S. Cl. .................. 318/447; 318/798; 318/805; 318/808; 318/434; 318/490
[58] Field of Search .................... 318/798–815, 318/447, 434, 490

[56] References Cited

U.S. PATENT DOCUMENTS 4,123,693 10/1978 Anderson et al. .................. 318/447 X
4,710,692 12/1987 Libert et al. .......................... 318/729

*Primary Examiner*—Karen Masih
*Attorney, Agent, or Firm*—Venable; Norman N. Kunitz; Allen Wood

[57] ABSTRACT

A circuit for operating an electric motor includes a feedback arrangement which generates a control variable signal that is supplied to a drive stage for the motor. The circuit also includes a monitoring arrangement to ascertain whether the motor is overloaded. The monitoring arrangement emits an overload signal if it detects an overload state, and the control variable signal is then reduced. In one embodiment, the monitoring arrangement detects an overload state by comparing a motor voltage signal to a motor voltage limit value which is a function of the motor current, and emits the overload signal if the motor voltage signal is smaller than the motor voltage limit value.

32 Claims, 2 Drawing Sheets

CIRCUIT FOR OPERATING AN ELECTRIC MOTOR

BACKGROUND OF THE INVENTION

The invention is based on a circuit for operating an electric motor, in which the current flowing through the motor is predetermined, the circuit having a monitoring arrangement for ascertaining an overload state of the motor, the monitoring arrangement comparing the motor voltage to a motor voltage limit value that is predetermined by a limit value generator and emitting an overload signal when the motor voltage limit value is not met.

A method of operating an electric motor in which the motor power can be changed as a function of the presetting of a nominal value is known from DE-A 41 29 086. If the nominal value is below a predeterminable threshold, corresponding to low motor power, the voltage applied to the motor is regulated. If the nominal value is above the threshold, corresponding to a higher motor power, the current flowing through the motor is regulated. The known method is supplemented by safety devices. Examples of safety devices include overcurrent shutoff and short-circuit shutoff. In overcurrent shutoff or overcurrent limitation of the current flowing through the electric motor, the actual current value signal emitted by a current sensor is supplied to an overcurrent limiter, which compares the signal to an internally-predeterminable threshold value. After a threshold is exceeded, the overcurrent limiter transmits a switching signal to a selection circuit to suppress the control signal for an end or drive stage. The shutoff signal can also be fed to the motor-drive circuit or the current regulator.

Depending on the type of application, it may occur that a limitation of the current flowing through the electric motor to a fixed, predetermined maximum value does not suffice to provide the used components with permanent protection against thermal overload.

SUMMARY OF THE INVENTION

It is the object of the invention to provide a circuit for operating a motor that assures particularly reliable protection of an end stage and/or the electric motor against thermal overload.

The object is accomplished by a circuit for operating a motor, of the type described at the outset, which is characterized in that the motor voltage limit value is a function of the motor current.

In accordance with a first embodiment of the circuit of the invention, in which the current flowing through the electric motor is set at a predetermined value, a monitoring arrangement compares the motor voltage to a predetermined motor voltage limit value. If the monitoring arrangement determines that the motor voltage limit value is not met, the arrangement emits an overload signal.

In accordance with another embodiment of the circuit of the invention, in which the motor voltage is set at a predetermined value, a monitoring arrangement compares the current flowing through the electric motor to a predetermined motor current limit value that is dependent on the predetermined motor voltage. If the motor current limit value is exceeded, the monitoring arrangement emits an overload signal.

The key feature of the embodiments of the circuit of the invention is that the electric-motor countervoltage in the motor is rpm-dependent. If the motor or the drive connected to the motor is sluggish, the rpm drops and, consequently, so does the electric-motor countervoltage. The electric-motor countervoltage drops to zero if the electric motor is blocked.

The two embodiments of the circuit of the invention have the advantage that overload or complete blockage of the electric motor can be represented by electrical signals that can be detected with simple means. No further sensors, such as an rpm sensor or a temperature sensor, are necessary.

A particularly advantageous modification of the circuit of the invention, in which the current flowing through the electric motor is set at a predetermined value, provides that the motor voltage limit value present in the monitoring arrangement is set as a function of the predetermined motor current. With this measure, it is possible to adapt the motor voltage limit value to different operating conditions.

Another advantageous embodiment provides that, instead of the directly-detected motor current, the predetermined nominal motor current value is processed in the monitoring arrangement. With this measure, it is possible to omit possibly necessary level-adaptation circuits.

A particularly advantageous embodiment provides that a value that is proportional to the motor voltage is fed to the monitoring arrangement. This measure allows the omission of a measurement of the motor voltage, which must be taken as a function of the wiring of the electric motor as a voltage-difference measurement. An example of a value proportional to the motor voltage is the nominal motor voltage occurring in the embodiment of the circuit of the invention that predetermines the voltage at the electric motor. A different value proportional to the motor voltage is a control variable of a controlled voltage source contained in the actuation of the end or drive stage. The controlled voltage source can be used in both the circuit that predetermines the current flowing through the electric motor and the circuit that sets the motor voltage.

An advantageous modification provides that the monitoring arrangement does not emit the overload signal until a predeterminable time has expired. The predeterminable time is a delay time that takes into account the run-up of the electric motor starting from the off state. The unsteady state that occurs during run-up and could lead to erroneous generation of the overload signal can be kept in check with this measure.

Another modification provides that the overload signal reduces the nominal value for the motor voltage or the motor current. Operation of the electric motor with limited power is still possible despite an overload, for example due to sluggishness.

An advantageous modification provides that the overload signal is suppressed after a predetermined time. If the electric motor is further overloaded, the overload signal is emitted again. In this operation, periodic attempts are made to turn on the electric motor. The times during which the overload signal is emitted or suppressed are advantageously measured such that, despite an overload of the electric motor, the average power is limited to a value that does not represent a danger of thermal overload of the electric motor and/or the end stage.

The circuits of the invention for operating an electric motor are particularly suited for use in a fan, with the ventilator being used to cool the electric motor and/or the drive stage simultaneously.

DESCRIPTION OF THE PREFERRED EMBODIMENTS

Figure 1:
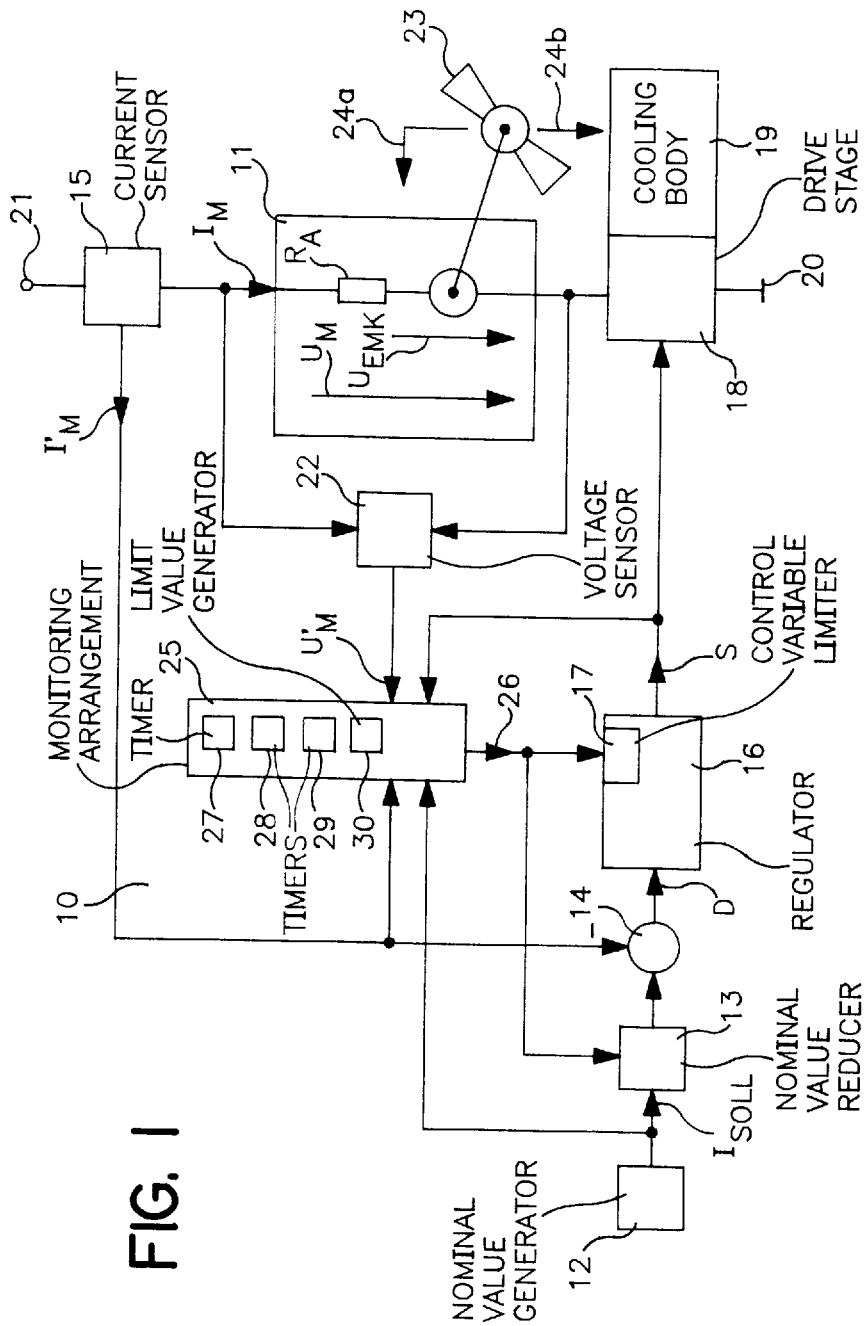
FIG. 1 shows a block diagram of a circuit of the invention for operating an electric motor, in which the current flowing through the electric motor is set.

FIG. 1 shows a current-regulating circuit 10 that regulates the current $I_M$ flowing through an electric motor 11 at a predetermined nominal current value $I_{SOLL}$. The current-regulating circuit 10 includes a nominal value generator 12, which transmits the nominal current value $I_{SOLL}$ to a nominal value reducer 13 that conducts the nominal current value $I_{SOLL}$ further to an adder 14. The adder 14 forms a difference between the nominal current value $I_{SOLL}$ and a motor current signal $I'_M$. The motor current signal $I'_M$ is a measure for the motor current $I_M$ that is produced by a current sensor 15.

The adder 14 transmits a deviation D to a regulator 16 that determines a control variable S. The regulator 16 includes a control variable limiter 17. The control variable S enters an end or drive stage 18 connected to a cooling body 19. The end drive stage 18 connects the electric motor 11 to an energy source, not shown in detail, by way of a first connection 20 and a second connection 21. The drive stage 18 is controlled with the control variable S in such a way that the motor current $I_M$ corresponds to the nominal current value $I_{SOLL}$.

The motor current $I_M$ leads to a motor voltage $U_M$, which corresponds to the voltage drop at an armature resistance $R_A$, to which an electric-motor countervoltage $U_{EMK}$ is added. The motor voltage $U_M$ is detected by a voltage sensor 22 that emits a motor voltage signal $U'_M$ as a measure for the motor voltage $U_M$.

The electric motor 11 actuates a ventilator 23 that emits a first air current 24a in the direction of the electric motor 11 and a second air current 24b in the direction of the cooling body 19 of the end stage 18.

The nominal current value $I_{SOLL}$, the motor current signal $I'_M$, the motor voltage signal $U'_M$ and the control variable S are supplied to a monitoring arrangement 25 that produces an overload signal 26, which is transmitted to both the nominal value reducer 13 and the control variable limiter 17. The monitoring arrangement 25 includes a first, a second and a third timer 27, 28 and 29, respectively. The monitoring arrangement 25 further includes a limit value generator 30.

The circuit of the invention for operating the electric motor 11 that is shown in FIG. 1 operates as follows:

The motor current $I_M$ flowing through the electric motor 11 is regulated by the current-regulating circuit 10 at the nominal current value $I_{SOLL}$ generated by the nominal value generator 12. To regulate the current, the regulating circuit 10 includes the adder 14, which determines the deviation D from the nominal current value $I_{SOLL}$ and the motor current signal $I'_M$. The regulator 16 establishes the control variable S as a function of the deviation D. The regulator 16 can be configured in accordance with the extensive background literature on regulating technology, for example as a proportional or proportional-plus-integral regulator. Both analog and digital regulators are suitable. The control variable S can be an analog signal that is supplied to the drive stage 18. However the control variable is preferably a digital, pulse-width-modulated signal that effects a clocked operation in the end stage 18. In this clocked operation, the electric motor 11 is connected to the energy source not shown in detail, or is completely shut off, in rapid temporal sequence. The result is an average motor voltage $U_M$ that leads to the desired motor current $I_M$ as a function of the load set by the ventilator 23. The drive stage 18 can be characterized as a controlled voltage source that sets the motor voltage $U_M$ variably at a value at which the motor current $I_M$ is at least approximately equal to the nominal current value $I_{SOLL}$.

The clocked operation of the drive stage 18 with the pulse-width control permits the drive stage 18 to be designed for a switching operation that results in minimal energy loss in the drive stage 18 that must be dissipated via the cooling body 19.

The motor current $I_M$ is detected by a suitable current sensor 15. With small currents, for example currents of a few Amps, an ohmic measuring resistor can be used. With large currents, other sensors are better suited, for example those that detect the magnetic field accompanying the motor current $I_M$. Hall elements, magnetoresistive elements or inductive sensors are examples of suitable sensors. A voltage drop at a component in the drive stage is also a measure for the motor current $I_M$.

The current-regulating circuit 10 permits the generation of at least approximately constant torque of the electric motor 11. A particular advantage of a constant torque in a fan having the ventilator 23 is that an at least approximately constant air flow rate can be effected. In other uses as well, the motor current $I_M$ assumes a critical role because of its direct relationship to torque. With a given motor current $I_M$, blockage or sluggishness of the electric motor 11 can be recognized through a drop in the motor voltage $U_M$. Sluggishness or complete blockage of the electric motor reduces the electric-motor countervoltage $U_{EMK}$, which becomes zero when the electric motor 11 is blocked.

One feature of the circuit is the monitoring arrangement 25 that compares the motor voltage signal $U'_M$ to the motor voltage limit value produced by the limit value generator 30. If the motor voltage signal $U'_M$ falls below the predetermined motor voltage limit value, the monitoring arrangement 25 emits the overload signal 26. The overload signal 26 can trigger a warning signal, for example. In the embodiment illustrated in FIG. 1, the overload signal 26 can, for example, lower the nominal current value $I_{SOLL}$ predetermined by the nominal value generator 12 by a predetermined amount, or even make it zero, in the nominal value reducer 13. It is also possible for the overload signal 26 to lower, for example, the control variable S of the regulator 16 by a predetermined amount or to zero with the control variable limiter 17 included in the regulator 16.

A particularly advantageous embodiment provides that the motor voltage limit value produced by the limit value generator 30 is established as a function of the motor current $I_M$. Therefore, in accordance with a first embodiment, the motor current signal $I'_M$ is supplied to the monitoring arrangement 25. In accordance with another embodiment, the nominal current value $I_{SOLL}$ can alternatively be supplied to the monitoring arrangement 25 instead of the motor current signal $I'_M$. At least in the steady operating state, the nominal current value $I_{SOLL}$ is proportional or at least approximately proportional to the motor current signal $I'_M$. Depending on the circuitry employed in the embodiment, it can be useful to use the nominal current value $I_{SOLL}$ instead of the motor current signal $I'_M$. This is the case, for example, when the two signals $I_{SOLL}$, $I'_M$ are connected to different potentials, so that potential-adaptation circuits may be necessary.

Another particularly advantageous embodiment provides that, instead of the motor voltage signal $U'_M$, the control variable S is supplied to the monitoring arrangement 25. The omission of the voltage sensor 22 is especially advantageous, because a voltage-difference measurement, as in the illustrated embodiment, is necessary depending on the circuitry employed in the embodiment. Instead of the motor voltage signal $U'_M$, therefore, a value that is proportional to the motor voltage $U_M$ should be used in the comparison. For example, the control variable S is a suitable value because a drop in the motor voltage $U_M$ due to a reduction or omission of the electric-motor countervoltage $U_{EMK}$ is associated with sluggishness or a complete blockage. The drive stage 18 must therefore predetermine a smaller motor voltage $U_M$ as a function of the control variable S to maintain the motor current $I_M$ at the predetermined nominal current value $I_{SOLL}$. The control variable S therefore decreases with the motor voltage $U_M$.

The first timer 27 of the monitoring arrangement 25 is set at a time that corresponds to the run-up of the electric motor 11 from standstill to the predetermined normal-rating operation, at which the predetermined motor current $I_{SOLL}$ is reached. During the time predetermined by the first timer 27, emission of the overload signal 26 is suppressed. The first timer 27 recognizes the turning on of the electric motor 11 through a first-time presetting of a nominal current differing from zero.

The second and third timers 28, 29 permit a periodic, recurring attempt to start up the electric motor 11 despite an ascertained overload state. The second timer 28 starts, for example, simultaneously with the occurrence of the overload signal 26. The time set by the second timer 28 therefore establishes the shutoff time of the electric motor 11 or the time of reduced power. After the time predetermined by the second timer 28 has expired, the overload signal 26 is suppressed during the time predetermined by the third timer 29. Therefore, during the time predetermined by the third timer 29, an attempt is made to begin normal-rating operation of the electric motor 11. A temporary blocked state or temporary sluggishness is identified with this measure. Because the third timer 29 predetermines a turn-on time and the second timer 28 predetermines a shutoff time or the time of reduced power, it is possible to keep thermal overload of both the electric motor 11 and the drive stage 18 cooled by the cooling body 19 within preset limits, even if overload occurs during long-term unsteady operation.

A preferred use of the circuit of the invention for operating the electric motor 11 is in a fan, preferably one disposed in a motor vehicle and serving to ventilate the interior. The use of the current-regulating circuit 10, especially in the higher-power range, is advantageous in comparison to voltage control, as described in detail in the above discussion of the related art. The presetting of the current $I_M$ flowing through the electric motor 11 sets the torque produced by the electric motor 11 at least approximately at a predetermined value. The regulated-current operation of the electric motor 11 results in an only comparatively small change in the air flow rate when the impact pressure on the fan changes. It follows that the circuit is clearly well-suited for use in a fan, particularly one disposed in a motor vehicle.

A modification of the use in a fan in accordance with the invention provides that the drive stage 18 and/or the electric motor 11 is or are cooled by the air current 24a, 24b of the ventilator 23 itself. With this measure, it is possible to provide an inexpensive drive stage 18 whose permissible continuous energy loss can have a lower value than a drive stage 18 that does not benefit from additional cooling. A crucial feature of this modification, therefore, is that, when the electric motor 11 is sluggish or complete blockage exists, the motor current $I_M$ in the drive stage 18 and therefore the energy loss of the end stage are reduced after the additional cooling by the ventilator 23 has ended.

Instead of the current-regulating circuit 10 shown in FIG. 1, current control is also possible. The adder 14 and the regulator 16 can then be omitted. In this embodiment, the nominal value generator 12 transmits the nominal current value $I_{SOLL}$, as the control variable S, directly to the drive stage 18. The nominal current value $I_{SOLL}$ is, for example, a pulse-width-modulated signal that causes the drive stage 18, which is switched as a controlled voltage source, to predetermine an average motor voltage $U_M$. This embodiment necessitates the current sensor 15 and the voltage sensor 22, because the control variable S does not decrease when the electric motor 11 is overloaded.

A transistor, preferably a field-effect transistor, is suited to be the drive stage 18. In a bipolar transistor, the control variable is a control current that flows into the base during analog operation. In a field-effect transistor, the control variable S is a control voltage that impinges upon the gate. In all cases, a pulse-width-modulated, digital control variable S is provided in clocked operation.

Figure 2:
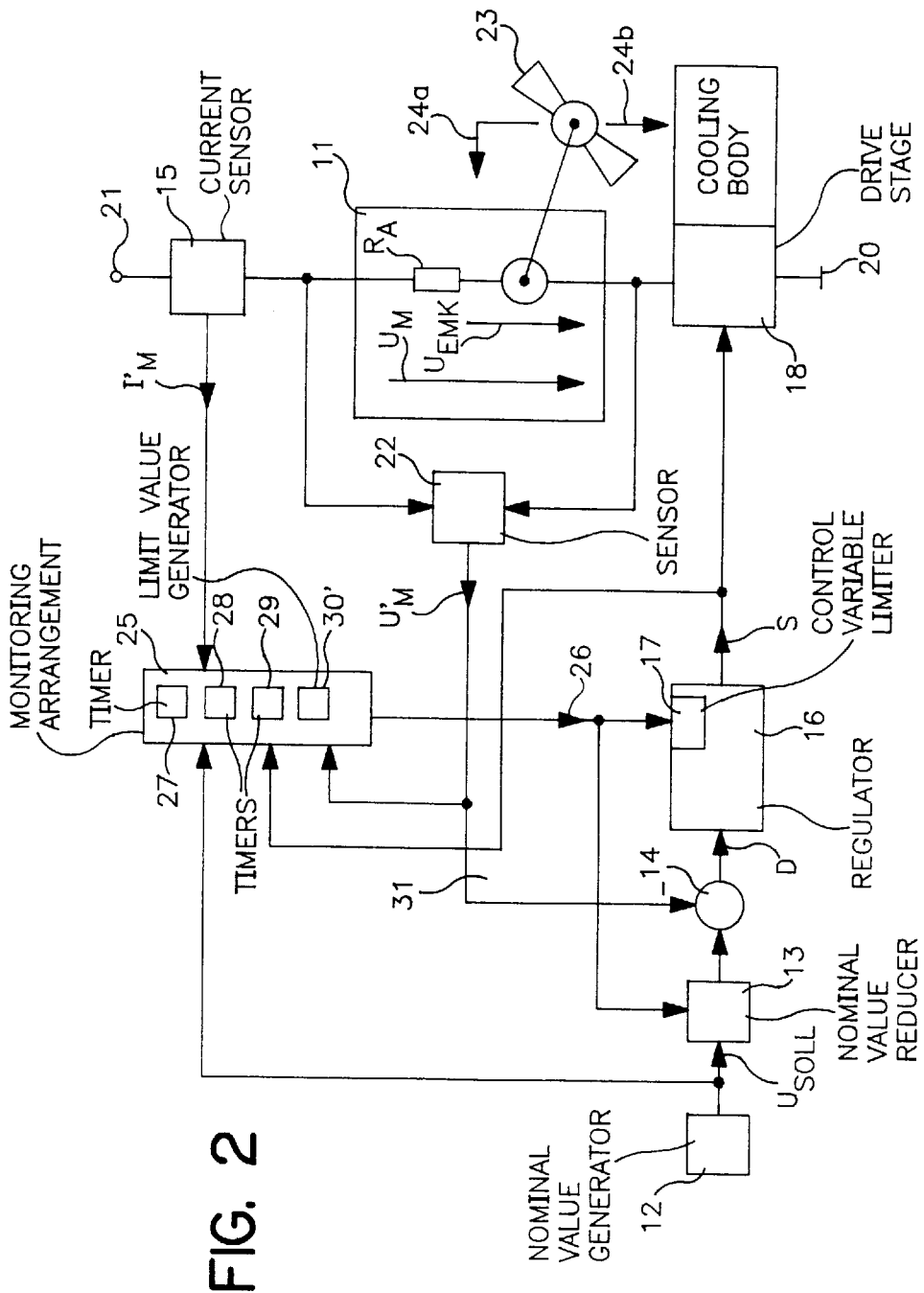
FIG. 2 shows a block diagram of a circuit of the invention for operating an electric motor, in which the motor voltage is set.

FIG. 2 shows an embodiment in which the circuit of the invention for operating the electric motor 11 predetermines the motor voltage $U_M$. The parts in FIG. 2 that correspond to those shown in FIG. 1 are provided with the same reference numerals. The essential difference between the two embodiments is that a voltage-regulating circuit 31 is provided in place of the current-regulating circuit 10 shown in FIG. 1. The nominal value generator correspondingly emits a nominal voltage value $U_{SOLL}$ that should be assumed by the motor voltage $U_M$. The motor voltage signal $U'_M$ is now supplied to the adder 14, instead of the motor current signal $I'_M$ in accordance with FIG. 1. The current sensor 15 is provided for producing the motor current signal $I'_M$, which is compared in the monitoring arrangement 25 to a motor current limit value that is predetermined by a limit value generator 30', with the motor current limit value being set as a function of the motor voltage $U_M$.

In this embodiment of the circuit of the invention for operating the electric motor 11, a value that is proportional to the motor voltage $U_M$ can be used instead of the detected motor voltage $U_M$, rather than the motor voltage signal $U'_M$, which is detected by the voltage sensor 22. Values that can be used are the nominal voltage value $U_{SOLL}$ and the control variable S occurring at the regulator 16. The voltageregulating circuit 31 can be replaced by a control of the motor voltage $U_M$, in which instance the adder 14 and the regulator 16 are omitted. The control variable S is then derived directly from the nominal voltage value $U_{SOLL}$, or is identical thereto. The configuration of the drive stage 18 of FIG. 2 corresponds to that of the drive stage of FIG. 1. Moreover, the temporal control with the timers 27, 28, 29 is identical in the monitoring arrangement 25 of both embodiments.

I claim:

1. A circuit for operating an electric motor (11), in which a current flowing through the electric motor (11) is predetermined, the circuit having a monitoring arrangement (25) for ascertaining an overload state of the electric motor (11), wherein the monitoring arrangement (25) compares a motor voltage ($U_M$) to a motor voltage limit value predetermined by a limit value generator (30), and emits an overload signal (26) when the motor voltage limit value is not met, characterized in that:

the motor voltage limit value is a function of the motor current ($I_M$).

2. A circuit according to claim 1, wherein a drive stage (18) is provided that is configured as a controlled voltage source through which the motor current ($I_M$) flows.

3. A circuit according to claim 1, wherein a first timer (27) is provided in the monitoring arrangement (25), which timer takes into consideration a run-up process for the electric motor from an off state by suppressing the overload signal (26).

4. A circuit according to claim 1, wherein the overload signal (26) reduces a nominal value ($I_{SOLL}$, $U_{SOLL}$).

5. A circuit according to claim 4, wherein the nominal value ($I_{SOLL}$, $U_{SOLL}$) is predetermined by a nominal value generator (12) and is reduced to zero.

6. A circuit according to claim 1, wherein a timer (28) is provided that emits the overload signal (26) for a time predetermined by the second timer (28), and a further timer (29) is provided that predetermines a time during which the overload signal (26) is suppressed.

7. A circuit according to claim 6, wherein the times predetermined by the two timers (28, 29) occur periodically and are measured so as to preclude a thermal overload of the electric motor (11) and/or a drive stage (18).

8. A circuit according to claim 1, wherein the electric motor (11) is used in a fan having a ventilator (23), and wherein the ventilator (23) of the fan cools the electric motor (11) and/or a drive stage (18) using air currents (24a, 24b).

9. A circuit for operating an electric motor (11), in which a current flowing through the electric motor (11) is predetermined, the circuit having a monitoring arrangement (25) for ascertaining an overload state of the electric motor (11), wherein the monitoring arrangement (25) compares a motor voltage ($U_M$) to a motor voltage limit value predetermined by a limit value generator (30), and emits an overload signal (26) when the motor voltage limit value is not met, characterized in that:

the motor voltage limit value is a function of a nominal current value ($I_{SOLL}$).

10. A circuit according to claim 9, wherein a drive stage (18) is provided that is configured as a controlled voltage source through which the motor current ($I_M$) flows.

11. A circuit according to claim 9, wherein a first timer (27) is provided in the monitoring arrangement (25), which timer takes into consideration a run-up process of the electric motor from an off state by suppressing the overload signal (28).

12. A circuit according to claim 9, wherein the overload signal (26) reduces a nominal value ($I_{SOLL}$, $U_{SOLL}$).

13. A circuit according to claim 12, wherein the nominal value ($I_{SOLL}$, $V_{SOLL}$) is predetermined by a nominal value generator (12) and is reduced to zero.

14. A circuit according to claim 9, wherein a timer (28) is provided that emits the overload signal (26) for a time predetermined by the second timer (28), and a further timer (29) is provided that predetermines a time during which the overload signal (26) is suppressed.

15. A circuit according to claim 14, wherein the times predetermined by the two timers (28, 29) occur periodically and are measured so as to preclude a thermal overload of the electric motor (11) and/or a drive stage (18).

16. A circuit according to claim 9, wherein the electric motor (11) is used in a fan having a ventilator (23), and wherein the ventilator (23) of the fan cools the electric motor (11) and/or a drive stage (18) using air currents (24a, 24b).

17. A circuit for operating an electric motor (11), in which a motor voltage ($I_M$) is predetermined, the circuit having a monitoring arrangement (25) that ascertains an overload state of the electric motor (11), and compares a motor current ($I_M$) to a motor current limit value predetermined by a limit value generator (30) and emits an overload signal (26) if the motor current limit value is exceeded, characterized in that:

the motor current limit value produced by the limit value generator (30) is a function of a value that is proportional to the motor voltage ($U_M$).

18. A circuit according to claim 17, wherein a nominal voltage value ($U_{SOLL}$) is provided as the value that is proportional to the motor voltage ($U_M$).

19. A circuit according to claim 17, wherein a motor voltage value ($U_M$) is provided as the value that is proportional to the motor voltage ($U_M$).

20. A circuit according to claim 17, wherein the overload signal (26) reduces a nominal value ($I_{SOLL}$, $U_{SOLL}$).

21. A circuit according to claim 20, wherein the nominal value ($I_{SOLL}$, $U_{SOLL}$) is predetermined by a nominal value generator (12) and is reduced to zero.

22. A circuit according to claim 17, wherein a timer (28) is provided that emits the overload signal (26) for a time predetermined by the second timer (28), and a further timer (29) is provided that predetermines a time during which the overload signal (26) is suppressed.

23. A circuit according to claim 22, wherein the times predetermined by the two timers (28, 29) occur periodically and are measured so as to preclude a thermal overload of the electric motor (11) and/or a drive stage (18).

24. A circuit according to claim 17, wherein the electric motor (11) is used in a fan having a ventilator (23), and wherein the ventilator (23) of the fan cools the electric motor (11) and/or a drive stage (18) using air currents (24a, 24b).

25. A circuit for operating a motor in response to a nominal current value signal, comprising:

means for producing a motor current signal which serves as a measure of current flowing through the motor;

means for generating a control variable signal which is a function of the difference between the nominal current value signal and the motor current signal;

means for producing a motor voltage signal which serves as a measure of voltage across the motor;

means for generating a motor voltage limit value, the motor voltage limit value being a function of the motor current signal or the nominal motor current signal;

means for generating an overload signal if the motor voltage signal is smaller than the motor voltage limit value;

means for reducing the control variable signal if the overload signal is generated; and means for driving the motor in response to the control variable signal.

26. The circuit of claim 25, wherein the motor voltage limit value is a function of the motor voltage current signal.

27. The circuit of claim 25, wherein the motor voltage limit value is a function of the nominal motor current signal.

28. The circuit of claim 26, further comprising timer means for suppressing the overload signal during a run-up process of the motor from an off state.

29. The circuit of claim 28, further comprising further timer means for timing the overload signal during a predetermined process after the run-up period and then suppressing the overload signal for a predetermined period.

30. The circuit for operating a motor in response to a nominal voltage value signal, comprising:

means for producing a motor voltage signal which serves as a measure of voltage across the motor;

means for generating a control variable signal which is a function of the difference between the nominal voltage value signal and the motor voltage signal;

means for producing a motor current signal which serves as a measure of current flowing through the motor;

means for generating a motor current limit value, the motor current limit value being a function of a value that is proportional to the motor voltage signal;

means for generating an overload signal if the motor current signal is larger than the motor current limit value;

means for reducing the control variable signal if the overload signal is generated; and means for driving the motor in response to the control variable signal.

31. The circuit of claim 30, further comprising timer means for suppressing the overload signal during a run-up process of the motor from an off state.

32. The circuit of claim 31, further comprising further timer means for timing the overload signal during a predetermined period after the run-up process and then suppressing the overload signal for a predetermined period.

* * * * *